Sept 10, 1957 E. E. KROLL 2,805,489
INCLINOMETER
Filed July 3, 1953

Ervin E. Kroll
INVENTOR.

BY *Clarence A. O'Brien*
*and Harvey B. Jacobson*
Attorneys

United States Patent Office 2,805,489
Patented Sept. 10, 1957

2,805,489

INCLINOMETER

Ervin E. Kroll, McMinnville, Oreg.

Application July 3, 1953, Serial No. 365,860

1 Claim. (Cl. 33—213)

This invention relates to new and useful improvements in inclinometers, particularly for airplanes and motor vehicles, and the primary object of the present invention is to provide a small and compact inclinometer which may be readily attached to or removed from a structural portion of an airplane or motor vehicle in a convenient manner to permit a driver to accurately ascertain the inclination of up and down grades and further, to permit pilots to determine whether the plane is in the correct position to make a three-point landing.

Another important object of the present invention is to provide an inclinometer including a dial and a spirit level containing pointer with novel and improved means mounting the pointer on the dial for rotation relative thereto.

A further object of the present invention is to provide an inclinometer having novel and improved features over that disclosed in my U. S. Patent, No. 2,397,550, issued April 2, 1946, one of the outstanding improvements comprising a pointer constructed of a transparent material having pockets formed therein that will receive a leveling liquid.

A still further aim of the present invention is to provide an inclinometer that is extremely simple and practical in construction, strong and reliable in use, efficient and durable in operation, inexpensive to manufacture, and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
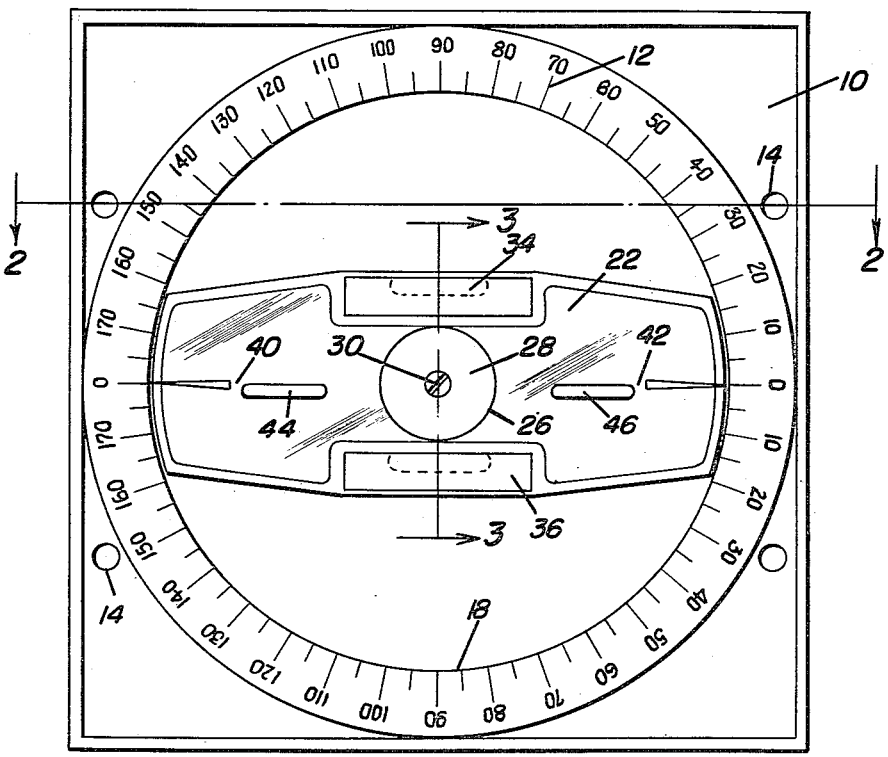
Figure 1 is a top plan view of the present invention.
Figure 2:
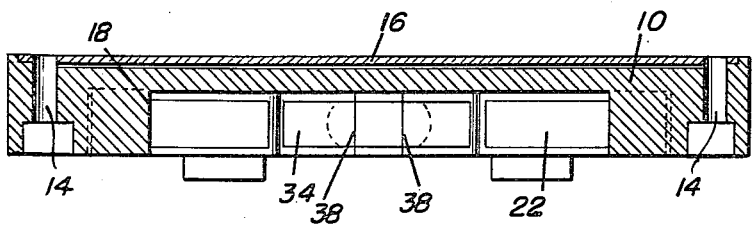
Figure 2 is a horizontal sectional view taken substantially on the plane of section line 2—2 of Figure 1.
Figure 3:
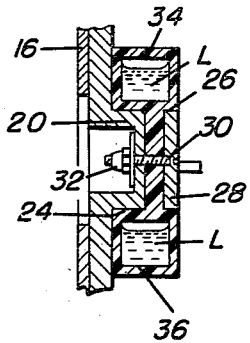
Figure 3 is a fragmentary vertical sectional view taken substantially on the plane of section line 3—3 of Figure 1.

Referring now to the drawings in detail, wherein for the purpose of illustration, there is disclosed a preferred embodiment of the present invention, the numeral 10 represents a substantially square base member or dial having degree graduations 12 on its forward face. The dial 10 is provided in relieved areas between the degree graduations and the margin of the base with apertures 14 that will receive fasteners, whereby the dial may be mounted stationary upon a supporting structure, such as a portion of an airplane or a motor vehicle. The rear face of the dial 10 has a thin sheet of material or a plate 16 secured thereto by suitable means, such as adhesive, and the rear face of the sheet of material 16 has suitable indicia or information thereon beneficial to drivers, pilots and the like.

The degree graduations 12 extend circumferentially about a cylindrical recess 18 in the front face of the dial 10. Recess 18 is concentric with a cylindrical hub portion 20 formed centrally on the dial 10. The material of the dial 10 is preferably pressed forwardly during molding or forming of the dial so as to produce the hub portion 20 which is open at its rear end.

An elongated pointer 22, preferably of plastic material, extends diametrically across the recess 18 and is located within the recess 18 for rotation. The rear face of the pointer is formed with a central cylindrical well or recess 24 that accommodates the hub portion 20, whereby the pointer may be confined within the recess 18 and rotatably supported on the hub portion 20.

The front face of pointer 22 is provided with a central depression or recess 26 that accommodates a washer 28 having a central countersunk aperture in registry with registering apertures in the central part of pointer 22 and the hub portion 20. A headed bolt 30 extends through these registering apertures and into the hollow interior of the hub portion 20 to threadingly engage a nut 32 that is extended into the hub portion from the open rear end thereof.

Pointer 22 is provided with a pair of spaced parallel longitudinally extending spirit levels in the form of pockets 34 and 36 which are suitably closed after sufficient colored leveling liquid L has been placed in the pockets to produce a bubble in each pocket. The material forming the pointer 22 is transparent so that the level bubbles in the pockets 34 and 36 may be readily viewed and correlated with spaced transverse centering lines 38 suitably provided on the longitudinal edges of the pointer. The forward face of pointer 22 is provided with oppositely extending longitudinally disposed arrows 40 and 42 for selectively registering with the degree markings of graduations 12.

A pair of longitudinally spaced forwardly projecting coaxial lugs 44 and 46 are formed with pointer 22 and constitute guiding lugs which will ride against an edge of a board when the base member is turned face down for measuring distances or drawing straight lines by using a scale (not shown) on sheet 16 at one side edge of base member 10.

In practical use of the present invention, the device is installed upon a portion of an airplane or a motor vehicle with the arrows 40 and 42 pointing to the zero degree markings of the graduations 12 and with the level bubbles located between the centering lines 38 of pointer 22. The pilot understanding at what degree the plane must approach a landing, merely rotates the pointer 22 to this degree and maintains the plane so that the level bubble in one of the pockets will remain between its correlated centering lines 38. Then, the pilot will approach the landing field at the proper angle.

The device is also employed by motorists to conveniently and accurately ascertain the inclination of up and down grades, and in this regard, indicia, such as degrees and percentage grades comprise the indicia provided on the rear face of the sheet 16.

What is claimed as new is as follows:

An inclinometer comprising a dial having a front face and a cylindrical recess in said front face, said dial also having a central cylindrical hollow hub portion disposed within and concentric of said recess, said hub terminating below the plane of said front face, an elongated pointer having spaced parallel longitudinally extending closed pocket portions with level bubbles therein, said pointer including an inner face with a cylindrical well in which said hub portion is located, said pointer being disposed in and extending diametrically across said recess and being rotatably supported on said hub portion, said pointer having an outer face with a depression therein over the well, a washer in the depression, a headed bolt extending through the washer and the hub portion, and a nut concealed in the hub portion and threaded on the bolt, said bolt being disposed intermediate said pocket portions and along a line between centers of said pocket portions.

References Cited in the file of this patent

UNITED STATES PATENTS

| | | |
|---|---|---|
| 449,609 | Green | Mar. 31, 1891 |
| 555,771 | Hahnbaum | Mar. 3, 1896 |
| 756,949 | Ferguson | Apr. 12, 1904 |
| 2,527,189 | Kittelson | Oct. 24, 1950 |
| 2,527,961 | Rantz | Oct. 31, 1950 |
| 2,541,880 | McMillan et al. | Feb. 13, 1951 |
| 2,576,202 | Wullschleger | Nov. 27, 1951 |